United States Patent [19]

Parashikov

[11] Patent Number: 5,189,922

[45] Date of Patent: Mar. 2, 1993

[54] FORCE IMPULSE GENERATOR

[76] Inventor: Peter H. Parashikov, 11, V. Vodenicharski Street, Sofia, Bulgaria

[21] Appl. No.: 519,848

[22] Filed: May 7, 1990

[30] Foreign Application Priority Data

May 9, 1989 [BG] Bulgaria .................................. 88 391

[51] Int. Cl.$^5$ .............................................. F16H 21/26
[52] U.S. Cl. .......................................... 74/38; 74/44; 74/520
[58] Field of Search ........................ 74/38, 39, 44, 106, 74/110, 520

[56] References Cited

U.S. PATENT DOCUMENTS

| | | | |
|---|---|---|---|
| 2,708,848 | 5/1955 | Hohenner | 74/44 X |
| 2,986,947 | 6/1961 | Slettengren | 74/38 |
| 3,174,347 | 3/1965 | Hecht | 74/38 |
| 3,426,635 | 2/1969 | Nicklasson | 74/38 X |
| 3,795,168 | 3/1974 | Spachner et al. | 74/38 X |
| 4,347,754 | 9/1982 | Wehler | 74/520 X |

FOREIGN PATENT DOCUMENTS 2041437 4/1971 France .

391865 10/1973 U.S.S.R. .

Primary Examiner—Allan D. Herrmann
Assistant Examiner—David W. Laub
Attorney, Agent, or Firm—Michael G. Marinangeli

[57] ABSTRACT

A force impulse generator designed for machines with impulse action used for press working of metals, ceramics, cermet and other materials can produce force impulses with high values and large amplitude of displacement of the impulse body, with reduced overall size, high efficiency, increased service life and neutralized side forces. The generator includes a stationary base to which there is movably connected by means of columns a box shaped impulse body. In a cavity formed between the base and body, there are disposed two identical crank mechanisms, each of which has a bottom hinge segment, a bottom segment arm, a middle hinge segment, a top segment arm and a top hinge segment. The middle hinge segments are driven by connecting rods connected to a common crankshaft. As a result the impulse body is displaced reciprocally and produces an impulse of force.

4 Claims, 4 Drawing Sheets

FORCE IMPULSE GENERATOR

FIELD OF THE INVENTION

The invention relates to a force impulse generator which can be used in machines requiring an impulse action, such as machines for press-working of metals, cermet, ceramics and other materials, and for crushing rock materials.

BACKGROUND OF THE INVENTION

A known force impulse generator is disclosed in U.S.S.R. Inventor's Certificate 391,865 and in French Patent Specification 2,041,437. The known generator consists of a stationary base to which, in the direction of force transmission, there is movably mounted an impulse body. Thus, a cavity is formed between the base and the impulse body and in this cavity there is disposed a force converter driven by a motor. This force converter comprises a separator, seated in the stationary base, which is provided with pockets arranged around a circle, and spherical or conical bodies are mounted movably in these pockets. These bodies are in contact with identical profiled wavy surfaces, formed in the faces of the stationary base and the impulse body.

A drawback of the known force impulse generator is the small contact area between the spherical or conical bodies and the profiled wavy surfaces of the stationary base and the impulse body, and this results in relatively weak impulses of force.

Another drawback arises when contact between the spherical or conical bodies and the profiled wavy surfaces is interrupted: this causes impact loads which result in a short service life, a low efficiency and an increased noise level.

A further drawback lies in the non-uniform distribution of power flux in the force-transmitting surfaces, and this results in bending stresses which cause deformations.

Another drawback of the known device is the appearance of a reactive torque which is produced by the rotating force converter.

It is therefore a general object of this invention to develop a force impulse generator for producing strong force impulses with a large amplitude of displacement of the impulse body. It is also an object of the invention to provide a force impulse generator with reduced overall size and mass, high efficiency, reduced noise, increased service life and neutralized side forces.

SUMMARY OF THE INVENTION

These objects are achieved by the inventive force impulse generator which comprises a stationary base to which, in direction of the force transmission, there is movably connected an impulse body, thus forming a cavity between the base and the body with a force impulse converter disposed in this cavity. This force impulse converter comprises two identical crank mechanisms, each of which comprises a middle hinge segment with necks disposed on both sides in its axis, the necks being connected by means of connecting rods to a common crankshaft.

This middle hinge segment has double-convex, equal round cylindrical surfaces on it's top and bottom and these surfaces are in contact with respective surfaces of one side of a top and a bottom segment arm. The top and bottom segment arms each have concave round cylindrical surfaces opposite the surfaces in contact with the middle hinge segment and these concave round cylindrical surfaces of the segment arms are in contact with respective surfaces of top and bottom hinge segments.

The bottom hinge segment is attached to the impulse body, while the top hinge segment is attached to the stationary base. Through the stationary base and the top hinge segment there is preferably bored a lubricating hole connected to an elongated lubricating hole formed in the top and the bottom segment and to a lubricating slot formed in the middle hinge segment.

The impulse body is elastically pressed against the stationary base preferably by means of a spring and a clamp.

The axes of the middle segment hinges can be disposed in one horizontal plane with the crankshaft or the two middle segments and the crankshaft can each be disposed in a different horizontal plane.

An advantage of the force impulse generator according to the invention lies in the particularly high value of the impulse of force (1,000,000 kN and more) because of the large contact area of the round cylindrical surfaces of the middle hinge segments, the top and the bottom segment arms and the top and the bottom hinge segments.

Another advantage of the present invention is the smooth operation of the force impulse generator, since the contact between the round cylindrical surfaces of the hinge segments and the segment arms is not interrupted during operation and this also contributes to an improved lubrication, an improved efficiency, a reduced noise and an increased service life with increased amplitude of displacement of the impulse body.

Another advantage is the uniform distribution of the power flux because of the large bearing area of the hinge segments and the segment arms in the force-transmitting surfaces.

Another advantage is the neutralization of undesired side forces because of the opposite arrangement and action of both crank mechanisms.

BRIEF DESCRIPTION OF THE DRAWING

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
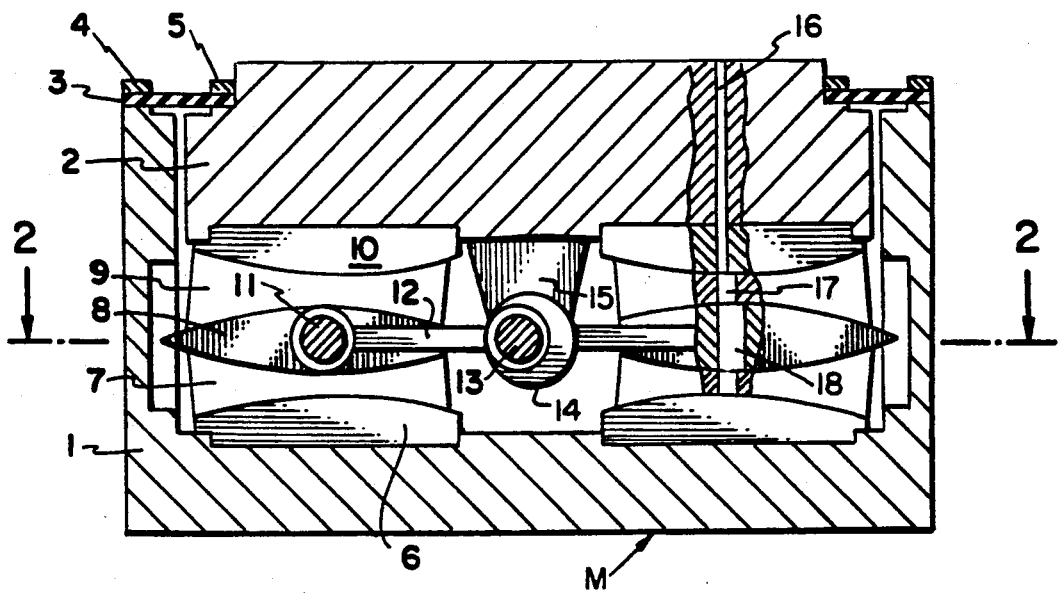
FIG. 1 is a vertical cross-sectional view of the generator along 1—1 of FIG. 2.

Referring now to FIG. 1, the force impulse generator according to the invention generally comprises a box-shaped impulse body 1, which is movably connected to a stationary base 2 and is preferably closed and the joint therebetween which by a seal 3, a clamping strip 4 and a strip 5 so that a closed space is formed between them. Between the impulse body 1 and the stationary base 2, there is disposed in the closed space a force converter which comprises two identical crank mechanisms, each of which comprises the following components, connected in succession:

a bottom hinge segment 6 attached to the impulse body 1, a segment arm 7, a middle hinge segment 8, a top segment arm 9, and a top hinge segment 10 attached to the stationary base 2.

The middle hinge segment 8 is provided with necks 11, which are disposed on both sides in its axis and are connected by means of connecting rod 12 to eccentric necks 13 of a crankshaft 14, which is seated in the bearing body 15.

Lubrication is preferably provided through the stationary base 2 and the top hinge segment 9 by a vertical bored cylindrical lubricating hole 16, connected to an elongated lubrication hole 17 and to a lubricating slot 18 in the middle hinge segment 8.

Figure 2:
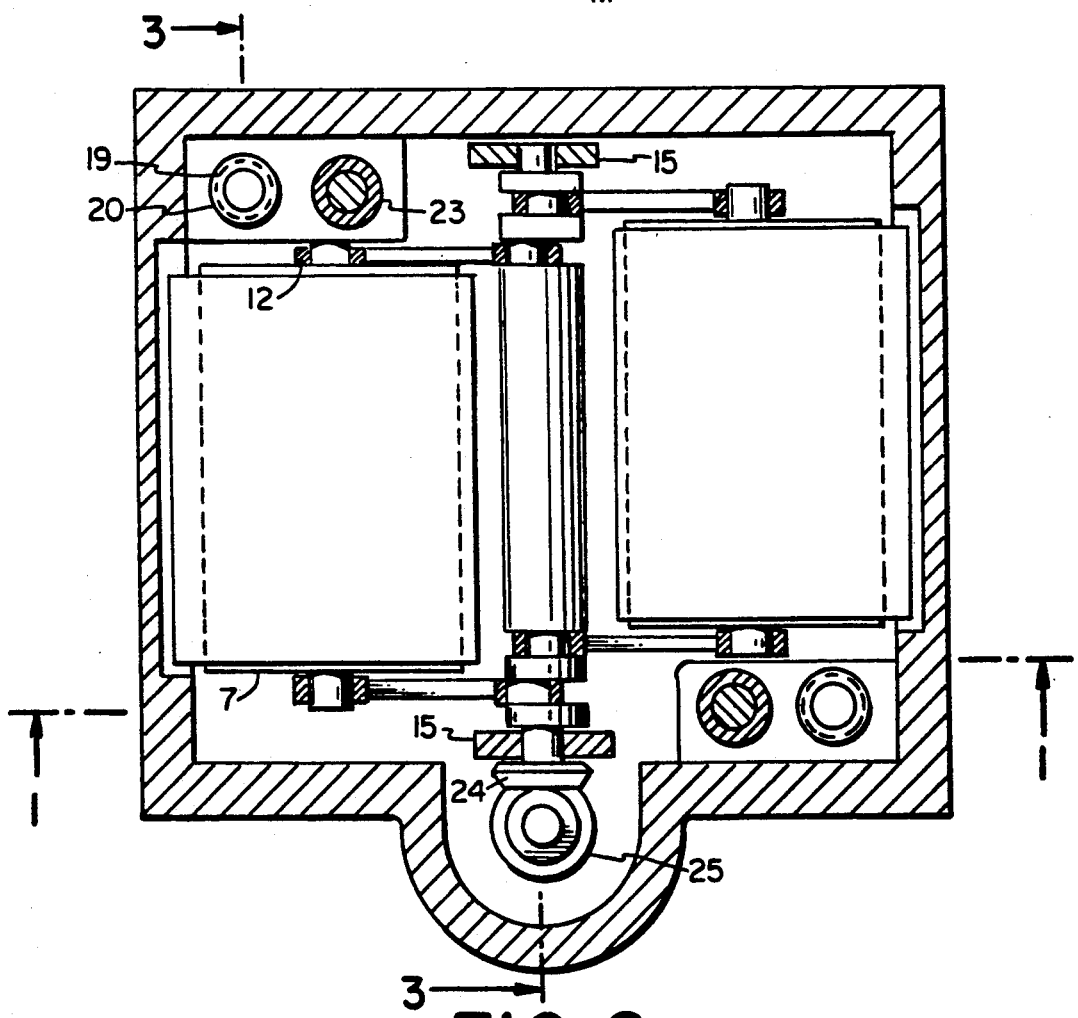
FIG. 2 is a vertical longitudinal sectional view along 2—2 of FIG. 1.

Referring now to FIG. 2, the impulse body 1 and the stationary base 2 are elastically connected preferably by means of spring 19, disposed inside a sleeve 20, compressed by clamp 21, and axially movable along a guiding column 22 and a guiding sleeve 23.

Figure 3:
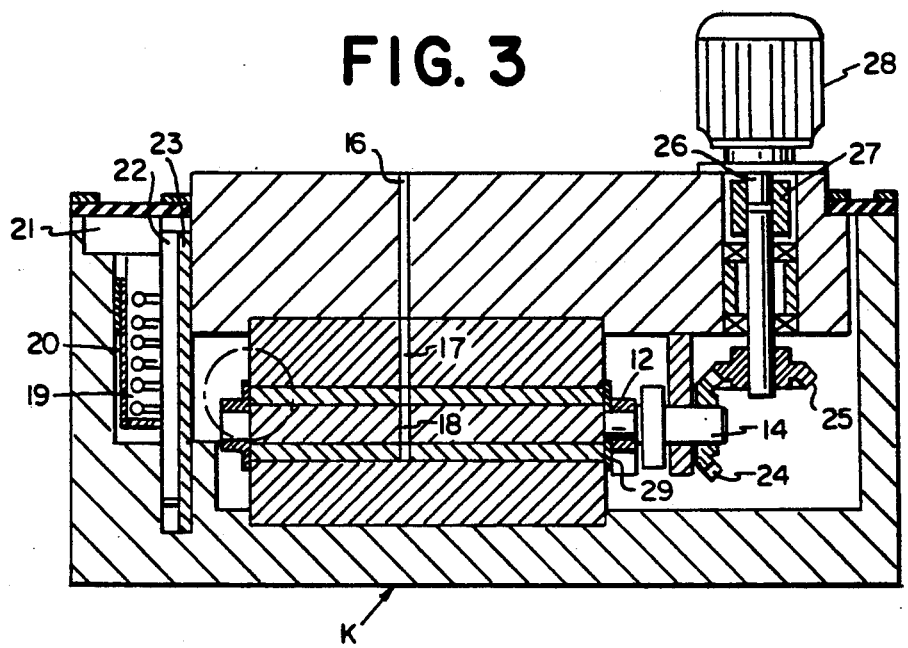
FIG. 3 is a horizontal sectional view along 3—3 of FIG. 2.

As shown in FIGS. 2 and 3, the crankshaft 14 is connected to a motor 28 preferably by means of a driven toothed gear 24, a driving toothed gear 25, a driving shaft 26 and a clutch 27.

Figure 4:
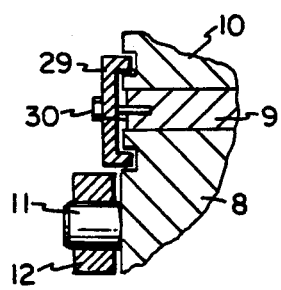
FIG. 4 is an exploded partial sectional view of the middle hinge segment, the top and the bottom segment arms and the guiding strip shown in FIG. 3 by the circled portion I.

FIG. 4 shows the middle hinge segment 8 movably attached to the bottom hinge segment 6 and the top hinge segment 10 by means of guiding strips 29, attached from the side to the bottom segment arm 7 and the top segment arm 9 by means of screws 30.

Figure 5:
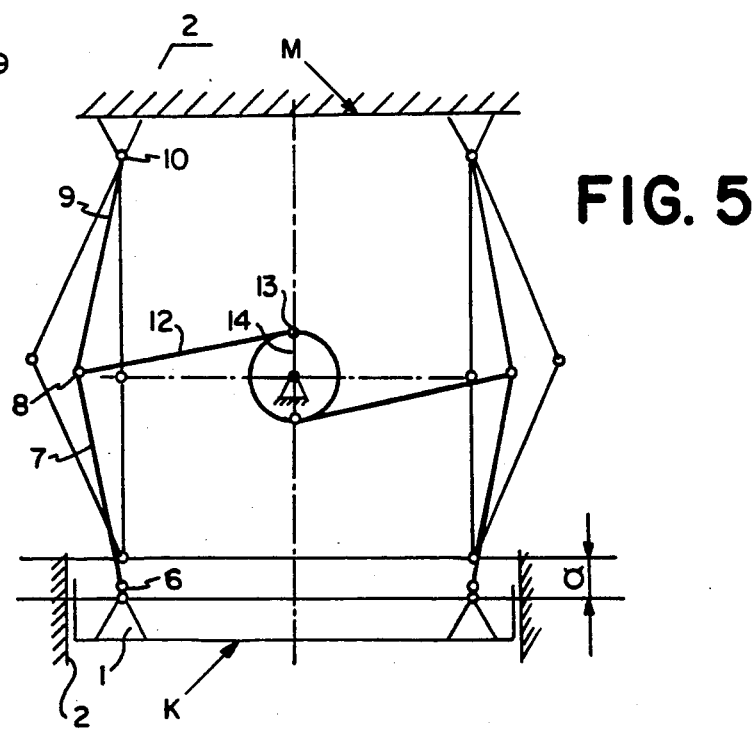
FIG. 5 is a schematic diagram of the force impulse generator.

FIGS. 1, 3, and 5 show the bottom face wall "K" of impulse body 1 and the top face wall "M" of the stationary base 2 formed as force-transmitting surfaces by means of which the generator is connected to a working machine (e.g. press, breaker, etc.).

Figure 6:
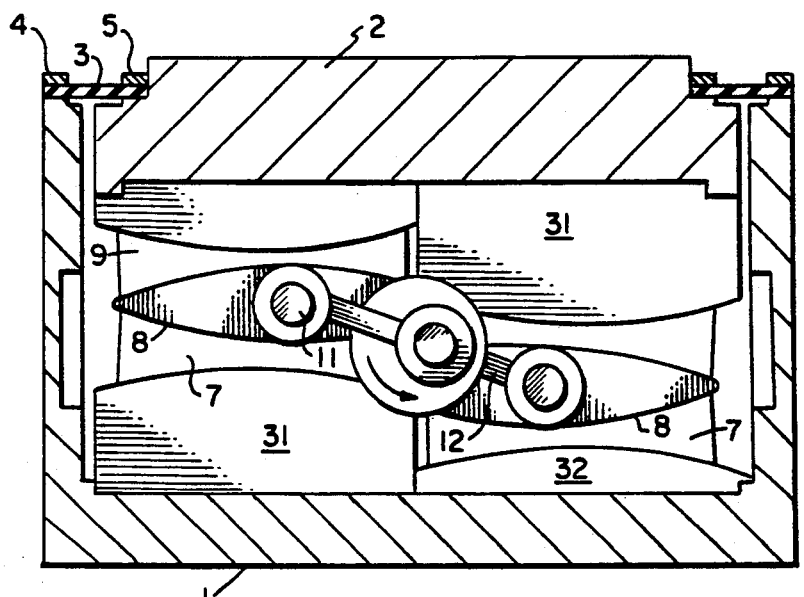
FIG. 6 is a vertical cross-sectional view of another embodiment of the force impulse generator with arrangement of the axes of the middle hinge segments and the crankshaft in three horizontal planes.

FIG. 6 shows a force impulse generator in which the bottom hinge segment 6 and the top hinge segment 10 are replaced by a high hinge segment 31 and a low hinge segment 32, respectively, and with that an axial offset Δ is obtained.

Figure 7:
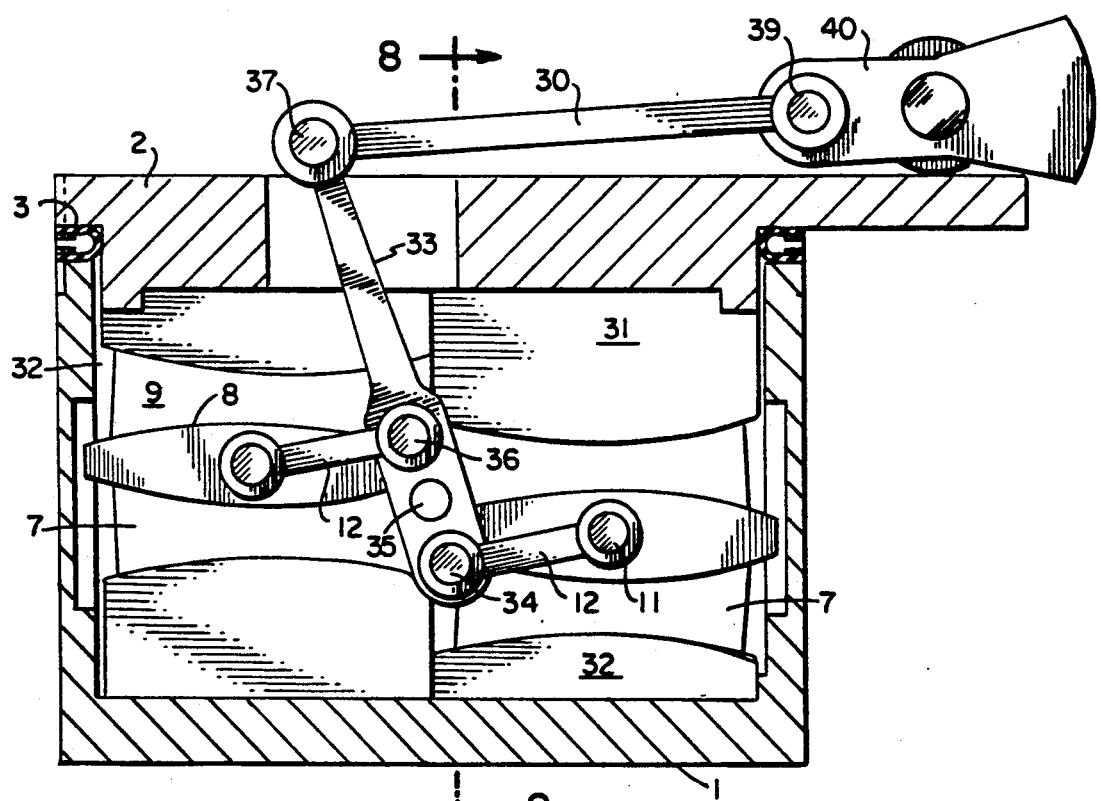
FIG. 7 is a vertical cross-sectional view of a force impulse generator with arrangement of the axes of the middle hinge segments and the crankshaft in three horizontal planes and with a lever drive.
Figure 8:
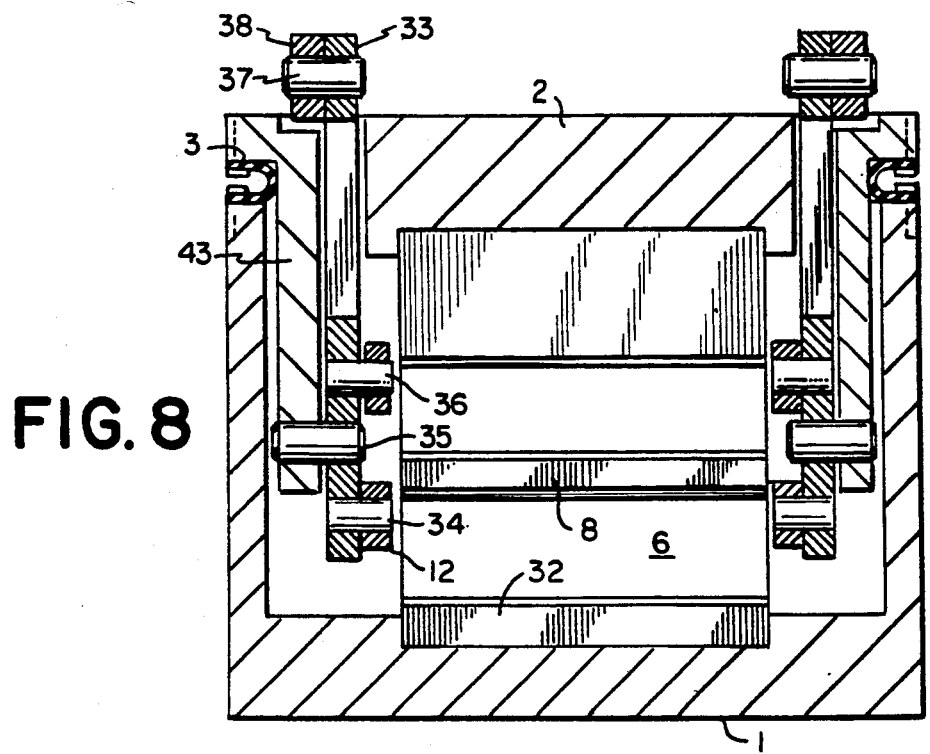
FIG. 8 is a vertical longitudinal sectional view along lines 8—8 of FIG. 7.

FIGS. 7 and 8 show a force impulse generator of the axial offset type with a lever drive in which the middle hinge segments 8 are connected to arm 33 by means of necks 11, connecting rod 12, bottom axle 34 and top axle 36, the arm 33 being seated in a supporting axle 35. The arm 33 is then connected at its top end to a connecting rod 38, which is connected to eccentric axle 39, fastened to arm 40 of crankshaft 41, which is seated in base bearing 42. The supporting axle 35 is fastened to bracket 43, which is a component of the stationary base 2.

MANNER OF OPERATION

Referring to the figures generally and to FIG. 5 in particular, operation of the motor 28 results in a torque transmitted via clutch 27, driving shaft 26, driving toothed gear 25 and driven toothed gear 24 to the crankshaft 14 which, by means of the eccentric necks 13, connecting rods 12 and necks 11, drives reciprocatingly and oppositely one to another the middle hinge segments 8.

The movement of middle hinge segments 8 deflect from the neutral position the bottom 7 and top 9 segment arms with respect to the bottom 6 and top 10 hinge segments and, with that, the impulse body 1 is displaced under the action of spring 19 and guiding strip 29 toward the stationary base 2 by a distance a.

When the middle hinge segments 8 return to neutral position, the impulse body 1 is displaced in the opposite direction by a distance a and transmits a force impulse to the working machine by means of the force transmitting surfaces "M" and "K".

During operation, the impulse body 1 is displaced with respect to the stationary base 2 by means of the guiding columns 22 and the guiding sleeves 23. The lubrication of the working surfaces is effected through the cylindrical lubricating hole 16, the elongated lubricating hole 17 and the lubricating slot 18.

The operation of the force impulse generator of the offset axial type (FIG. 6) is featured by sharper impulses of force and by a greater supporting area of the hinge segments (top segment 10, middle segment 8 and bottom segment 6) and the segment arms (top arm 9 and bottom arm 7).

Figure 9:
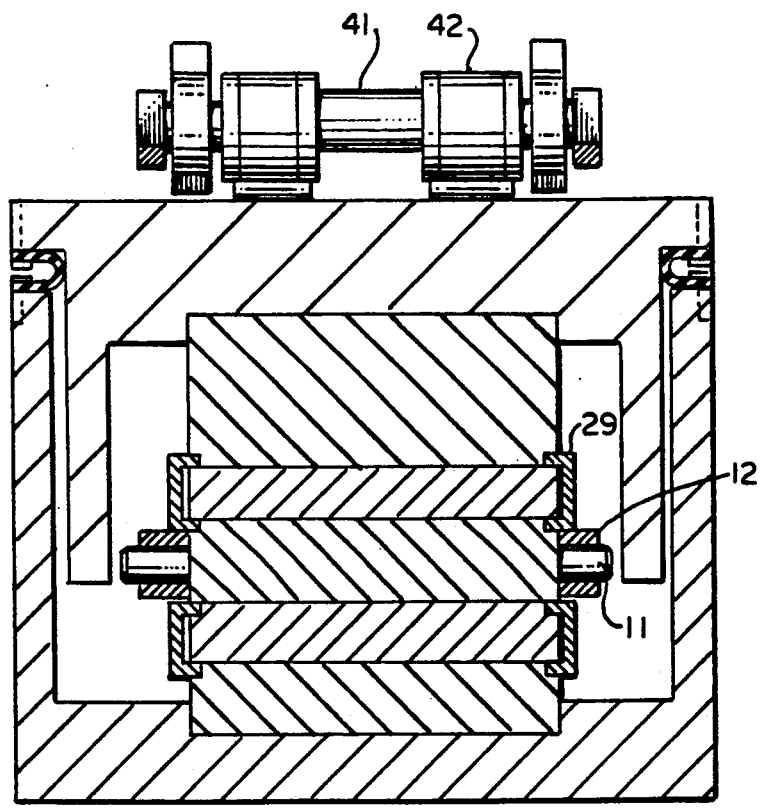
FIG. 9 is a vertical longitudinal sectional view along lines 9—9 in FIG. 7.

The drive of the force impulse generator of the offset axial type (FIGS. 7 to 9) is effected by an externally disposed crank mechanism. The motion of the crankshaft 41 is transmitted by connecting rod 38 to the arm 33, which effects an oscillatory motion around the supporting axle 35; and, by means of the top axle 36, the bottom axle 34 and the connecting rods 12, drives the middle hinge segments 8 in opposite directions, producing with that an impulse of force.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. Force impulse generator having a stationary base to which there is movably connected an impulse body, and in a cavity between them there is disposed a force impulse converter, wherein the force impulse converter comprises two identical crank mechanisms, each of which comprises a middle hinge segment with necks disposed on both sides in its axis, a top and bottom segment arm and a top and bottom hinge segment;

each middle hinge segment being connected by means of a connecting rod and eccentric neck to a common crankshaft;

each middle hinge segment having double-convex, identical round cylindrical surfaces which are in contact sliding with respective surfaces mating of one side of said bottom segment arm and one side of said top segment arm;

said top and bottom segment arms each having identical, concave round cylindrical surfaces mating at their other side in contact sliding with respective surfaces mating of said bottom and top hinge segments;

said bottom hinge segment being attached to said impulse body and said top hinge segment being attached to said stationary base.

2. Force impulse generator as claimed in claim 1 further comprising a cylindrical lubricating hole bored through the stationary base and the top hinge segment; an elongated lubricating hole in the bottom and the top segment arms; and a lubricating slot formed in the middle hinge segment;

the impulse body being elastically pressed against the stationary base by means of a spring, a sleeve and a clamp.

3. Force impulse generator as claimed in claim 1, wherein the axes of the middle hinge segments and the crankshaft are in the same horizontal plane.

4. Force impulse generator as claimed in claim 1, wherein the axes of the middle hinge segments and the axis of the crankshaft are each disposed in different horizontal planes.

* * * * *